United States Patent
Hsu et al.

(10) Patent No.: US 7,242,460 B2
(45) Date of Patent: Jul. 10, 2007

(54) METHOD AND APPARATUS FOR AUTOMATIC REGISTRATION AND VISUALIZATION OF OCCLUDED TARGETS USING LADAR DATA

(75) Inventors: Stephen Charles Hsu, East Windsor, NJ (US); Supun Samarasekera, Princeton, NJ (US); Rakesh Kumar, Monmouth Junction, NJ (US); Wen-Yi Zhao, Somerset, NJ (US); Keith J. Hanna, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 10/825,946

(22) Filed: Apr. 16, 2004

(65) Prior Publication Data

US 2005/0243323 A1 Nov. 3, 2005

Related U.S. Application Data

(60) Provisional application No. 60/464,555, filed on Apr. 22, 2003, provisional application No. 60/463,761, filed on Apr. 18, 2003.

(51) Int. Cl.
*G01C 3/08* (2006.01)
(52) U.S. Cl. ............ 356/4.01; 356/622; 382/294
(58) Field of Classification Search ............ 356/3.02, 356/3.06, 4.01, 139.03–139.08, 3.08; 382/109, 382/291, 293–295
See application file for complete search history.

(56) References Cited

U.S. PATENT DOCUMENTS

| | | | | |
|---|---|---|---|---|
| 5,251,271 A | * | 10/1993 | Fling | 382/162 |
| 5,550,937 A | * | 8/1996 | Bell et al. | 382/293 |
| 5,652,717 A | * | 7/1997 | Miller et al. | 703/6 |
| 5,995,681 A | * | 11/1999 | Lee et al. | 382/293 |
| 5,999,662 A | * | 12/1999 | Burt et al. | 382/284 |
| 6,078,701 A | * | 6/2000 | Hsu et al. | 382/294 |
| 6,519,372 B1 | * | 2/2003 | Eppler et al. | 382/294 |
| 6,738,532 B1 | * | 5/2004 | Oldroyd | 382/294 |
| 6,759,979 B2 | * | 7/2004 | Vashisth et al. | 342/357.13 |
| 2001/0038718 A1 | * | 11/2001 | Kumar et al. | 382/284 |
| 2002/0060784 A1 | * | 5/2002 | Pack et al. | 356/6 |

OTHER PUBLICATIONS

Arya, et al, "Approximate nearest neighbor queries in fixed dimension", Proc. ACM-SIAM Sympo Discrete Algorithms, 271-280, 1993.

(Continued)

*Primary Examiner*—Thomas H. Tarcza
*Assistant Examiner*—Isam Alsomiri
(74) *Attorney, Agent, or Firm*—Lowenstein Sandler PC

(57) ABSTRACT

A method and apparatus for high-resolution 3D imaging ladar system which can penetrate foliage and camouflage to sample fragments of concealed surfaces of interest is disclosed. Samples collected while the ladar moves can be integrated into a coherent object shape. In one embodiment, a system and method for automatic data-driven registration of ladar frames, comprises a coarse search stage, a pairwise fine registration stage using an iterated closest points algorithm, and a multi-view registration strategy. After alignment and aggregation, it is often difficult for human observers to find, assess and recognize objects from a point cloud display. Basic display manipulations, surface fitting techniques, and clutter suppression to enhance visual exploitation of 3D imaging ladar data may be utilized.

20 Claims, 15 Drawing Sheets

OTHER PUBLICATIONS

Albota, et al., "Three-dimensional imaging laser radar with a photon-counting avalanche photodiode array and microchip laser," Applied Optics, 41(36), Dec. 20, 2002, 7671-7678.

Bergevin, et al., "Towards a General Multi-View Registration Technique," IEEE Transactions on Pattern Analysis and Machine Intelligence, 18(5), May 5, 1996, 540-547.

Besl, et al., "A Method for Registration of 3-D Shapes," IEEE Transactions on Pattern Analysis and machine Intelligence, 14(2), Feb. 2, 1992, 239-256.

Hoppe, et al., "Surface Reconstruction from Unorganized Points," Compute Graphics, 26, Jul. 2, 1992, 71-78.

Hsu, et al., "Automatic registration and visualization of occluded targets using ladar data," Proc. SPIE Laser Radar Technology and Applications VIII, 5086, Apr. 2003, 1-12.

Pulli, K., "Multiview Registration for Large Data Sets," http://graphics.stanford.edu/papers/pulti-3dim99/3dim99.pdf.

Rusinkiewicz, et al., Efficient Variants of the ICP Algorithm, http://www.cs.princeton.edu/~smr/papers/fasticp/fasticp_paper.pdf.

Sawhney, et al., "Robust Video Masaicing through Toplogy Inference and Local to Global Alignment," Lecture Notes in Computer Science, 1407, 103,1998.

Schilling, et al., "Multiple-return laser radar for three-dimensional imaging through obscurations," Applied Optics, 41(15), May 20, 2002, 2791-2799.

* cited by examiner relative pose

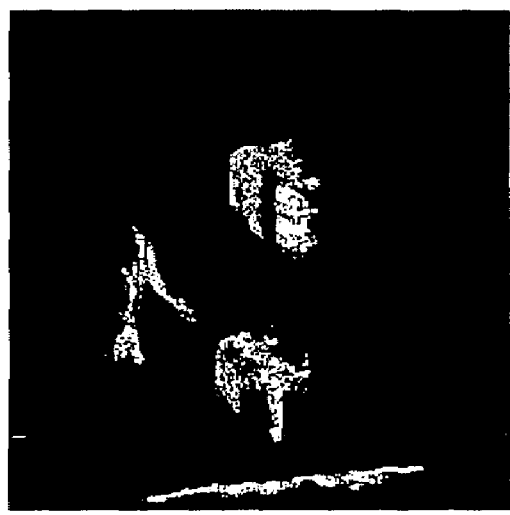
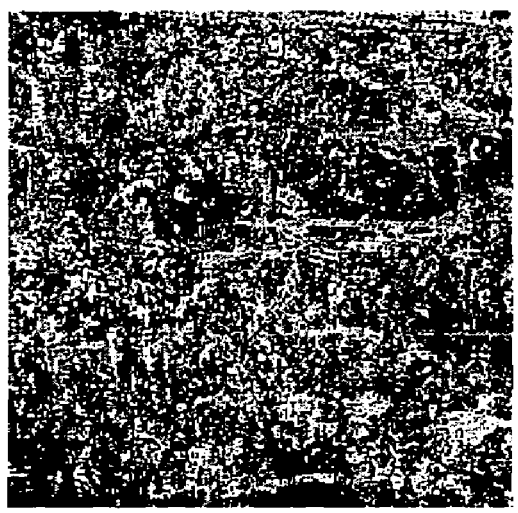
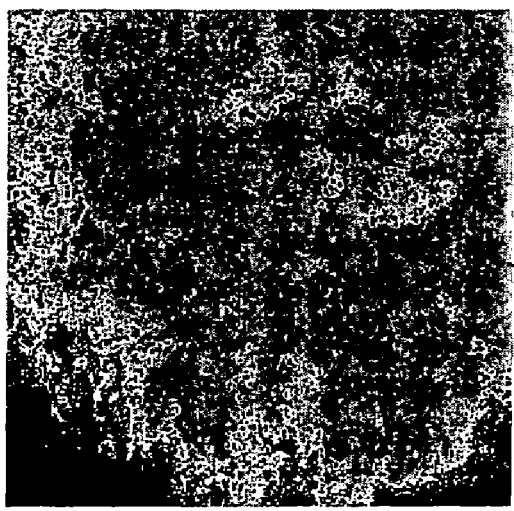
FIG. 14

METHOD AND APPARATUS FOR AUTOMATIC REGISTRATION AND VISUALIZATION OF OCCLUDED TARGETS USING LADAR DATA

CROSS-REFERENCE TO RELATED APPLICATIONS

This application claims benefit of U.S. provisional patent application Ser. No. 60/463,761, filed Apr. 18, 2003, and 60/464,555, filed Apr. 22, 2003 which are herein incorporated by reference.

GOVERNMENT RIGHTS IN THIS INVENTION

This invention was made with U.S. government support under contract number DAAD17-01-D-004, DAAD17-01-C-0055, F33615-02-C1265 and DAAD17-01-D-0006. The U.S. government has certain rights in this invention.

BACKGROUND OF THE INVENTION

The present invention generally relates to the ability to detect and recognize objects hidden behind porous occluders, such as foliage and camouflage, thereby enhancing operations in public safety, law enforcement, and defense. While any instantaneous view of the scene might contain rays hitting only a fraction of the object surface of interest, different fragments could be exposed by moving the object, the occluder, or the sensor. Theoretically, the aggregation of a diverse set of views should yield enough information to reconstruct the whole object. But achieving this goal with a 2D sensor is impractical for three reasons: the pores may be smaller than the sensor's pixel resolution, insufficient light from the object may reach the sensor, and segmenting a 2D image into object and occluder pixels is difficult.

In contrast, a 3D ladar imaging system can record multiple range echoes from a single laser pulse, enabling detection of concealed objects through pores smaller than the beam width. Ladar receivers can have high photon sensitivity yet not be overwhelmed by noise. The measured range values immediately provide foreground/background segmentation. A frame of ladar data is a collection of 3D points measured simultaneously or over a short period of time where motion is negligible. However, combining multiple frames from a moving sensor requires proper alignment of the frames to a common coordinate system. In topographic mapping using aerial ladar, it is feasible to rely on accurate Global Positioning System/inertial Navigation System (GPS/INS) based pose determination to align sensed 3D points. However, weight, cost, and real-time constraints may preclude such accurate pose measurement in certain applications. Therefore, there is a need in the art for data-driven registration of ladar frames.

SUMMARY OF THE INVENTION

In one embodiment, the present invention comprises a system for automatic data-driven registration of ladar frames, comprising one or more processing steps. For example, the present system may comprise a coarse search stage, a pairwise fine registration stage using an iterated closest points algorithm and a multi-view registration strategy, and a system for enhancing visual exploitation of aligned and aggregated ladar frames, comprising display manipulations, surface fitting techniques, and clutter suppression.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 14 illustrates digital images of clutter removal;

DETAILED DESCRIPTION

Figure 1:
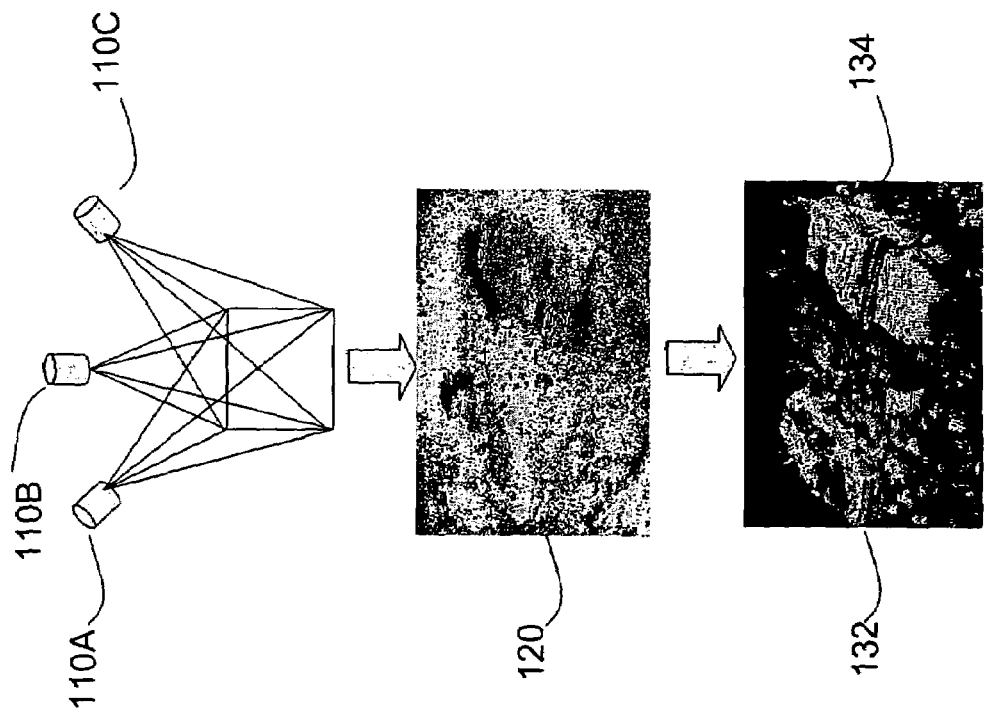
FIG. 1 illustrates a set of sensors according to one embodiment of the present invention.

Embodiments of the present invention show some characteristics of ladar frames collected by sensors in an operational scenario. FIG. 1 illustrates a set of sensors 110A-C adapted to collect data from a scene. Although there are only three sensors shown in FIG. 1, more could be utilized to implement the present invention. Alternatively, 110A-C in fact may illustrate only a single ladar sensor that is moved to three different locations. Sensors 110A-C may be ladar sensors or some other visual data collection device. Sensors 110A-C may be carried by a person or deployed on any land, airborne, or amphibious vehicle, e.g., a motor vehicle, airplane, helicopter, boat, or a remotely controlled vehicle. Targets of interest 132, 134 are viewed through a dense scattering medium, e.g. a mass of foliage 120. Since the foliage 120 blocks almost all the rays to the targets 132, 134, the 3D points on the target surface may be sparse and irregular—too few for data-driven registration. Therefore, alignment should be determined from 3D samples of the foliage 120 and surroundings of the target rather than the target 132, 134 itself. Since the scattering elements are small and randomly placed, ladar returns from them are likely to be volumetrically sparse and vary between frames. Therefore, one cannot count on finding veridical corresponding points between frames or grouping points within a frame to infer local surface patches. Measurement noise usually causes greater uncertainty of 3D point positions down-range than cross-range.

Upon sensor 110A-C calibration, the bearings and time delays of ladar returns can be converted to 3D point coordinates. Depending on the ladar configuration, the resulting 3D point set may be organized or unorganized. When a scanning system samples points on a regular azimuth/elevation grid, the point set can be organized as a range image, a 2D array. Each pixel holds 0, 1, or more range values, depending on the number of distinct echoes recorded at that bearing. In contrast, a ladar that randomly scans a single beam while the platform moves rapidly in space produces an unorganized 3D point set. Somewhat different processing techniques are useful for the two cases.

As the ladar moves between frames, each frame of 3D points is formed in a separate sensor-centered coordinate system, which should be related to a common system by an unknown 3D congruence transformation; rotation and translation. The goal of registration is to deduce those motion parameters for every frame in a sequence of frames, by observation of the 3D points sets themselves. Notationally, there is a fixed scene with a collection of continuous surfaces forming a dense point set S. During the ith frame, the sensor has pose $(R_i, T_i)$ and sees a transformed scene $S_i=\{s|R_i s + T_i \epsilon S\}$ which is sampled by point set $P_i = \{p_{i1}, p_{i2}, \ldots\} \subset S_i$. One embodiment of the present invention estimates the pose parameters $(R_1, T_1), (R_2, T_2), \ldots$. The support of a frame is defined as the volume of space where points could potentially be detected by the ladar system. A frame's point set does not usually fill the support completely due to occlusion and because the volume includes empty space as well as surfaces.

Figure 2:
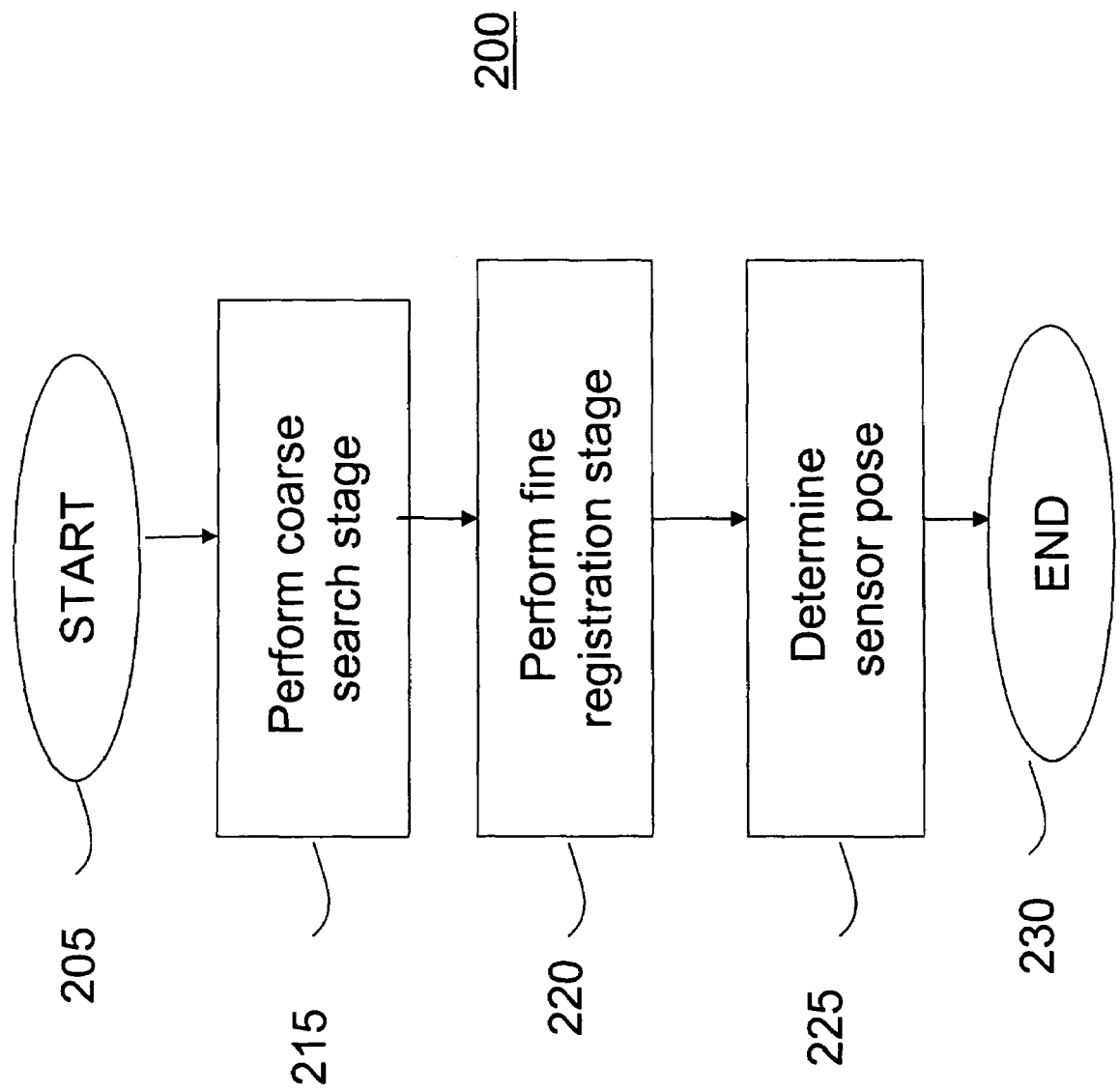
FIG. 2 illustrates a flow diagram in accordance with a method of the present invention.

FIG. 2 illustrates a diagram in accordance with a method 200 according to one embodiment of the present invention. The registration system of the present invention provides a two stage process to register any given pair of frames. Pairwise processing comprises a coarse search stage, to quickly but approximately align frames that could have large relative displacement, and a fine registration stage, to accurately align the frames in 6 degrees of freedom. Method 200 starts in step 205 and proceeds to step 215. In step 215 a coarse search stage is performed on ladar frames obtained from sensors 110A-C. In step 220 a fine registration stage is performed on the ladar frames. If the goal is to register an entire sequence of frames, a third stage comprising a multi-view strategy is used to schedule pairs of frames to register and to combine the pairwise transformations into sensor poses with respect to the scene coordinate system. Sensor pose is determined in step 225. Method 200 ends in step 230.

Pairwise registration finds the relative rotation and translation (R, T) relating two surfaces $S_j$ and $S_i=\{s|Rs+T\epsilon S_j\}$ using the observed point sample sets $P \subset S_i$, and $Q \subset S_j$. The capture range of the fine registration algorithm will be limited by problems of false matches, a scene dependent phenomenon. Therefore, if the initial displacement between two frames (after alignment via GPS/INS measurements, if any) might exceed the expected capture range, a coarse search stage may be necessary to estimate the approximate displacement. Otherwise, the coarse search stage 215 may be considered an optional stage.

The impact of noise upon a registration algorithm is profound. Due to significant noise, the first step of finding a closest point could be compromised. Even if the closest points are correctly identified, the estimated rigid motion (R&T) will deviate from the true solution based on noiseless data.

Data may be pre-processed to reduce noise by averaging around a neighbor. The neighborhood could be a sphere or a particular shape defined by local point/shape analysis. This pre-registration approach is referred to as static noise cleaning.

In another example, neighboring matched closest points are grouped together to form the (weighted) average closest points that subsequently used to update the motion. This approach is referred to as dynamic noise cleaning.

In step 215 a coarse search stage is performed. When imaging a support volume located at down-range distances large compared to the support depth, e.g. 100 m compared to 20 m, pose uncertainty for frames acquired close in time can be treated as primarily translational. Slight rotations of the ladar sensor are mainly manifested as translations of the volume, while large rotational error would cause the target to be completely missed anyway. Therefore, two coarse search methods were developed to estimate translation shifts.

The first approach, which is based on 2D image motion estimation, is applicable when the point sets can be meaningfully organized into range images. The first-return range images, which ignore multiple echoes, can be treated like any ordinary 2D intensity images and be registered assuming a 2D shift in the image plane. In one embodiment, the 2D image shift is estimated by multi-resolution correlation. The image shift is then scaled up by the observed median range to the scene, yielding the translation of the 3D ladar frame in the two cross-range directions. The translation in the down-range direction is estimated from the median difference of aligned range images.

Figure 3:
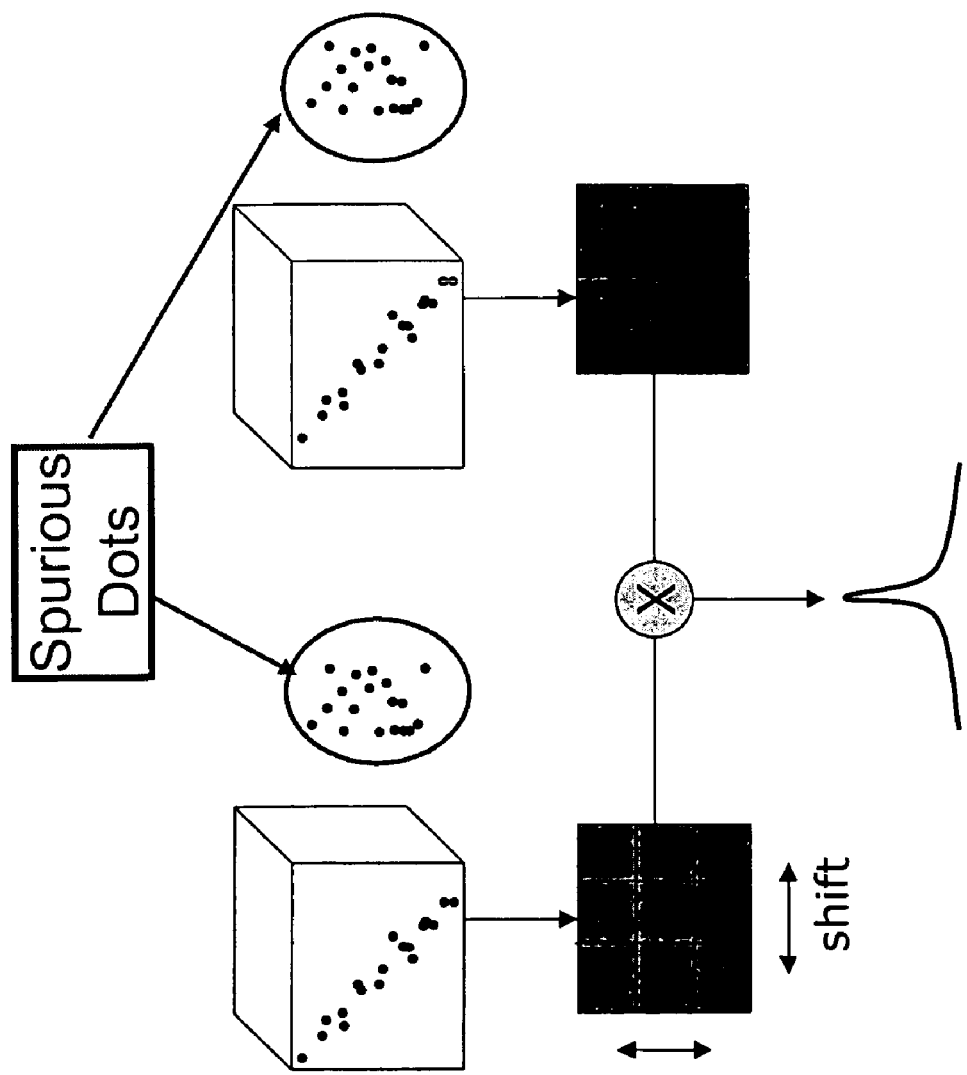
FIG. 3 illustrates a 2D correlation method in accordance with an embodiment of the present invention.

As illustrated in FIG. 3 a correlation peak consensus method is used to estimate 2D image shift. A low-pass image pyramid is constructed for each of the two images to be registered. Starting at a coarse level, one image is partitioned into tiles. Each tile is correlated with the other image over a search range commensurate with maximum expected misalignment, yielding a correlation surface. Correlation peaks are extracted as candidate translations for each tile. The most frequently recurring translations among all the tiles are accepted as candidate translations for the entire image. On subsequent finer levels, the same procedure is followed except that correlation search is performed only near candidates from the previous level.

Figure 4:
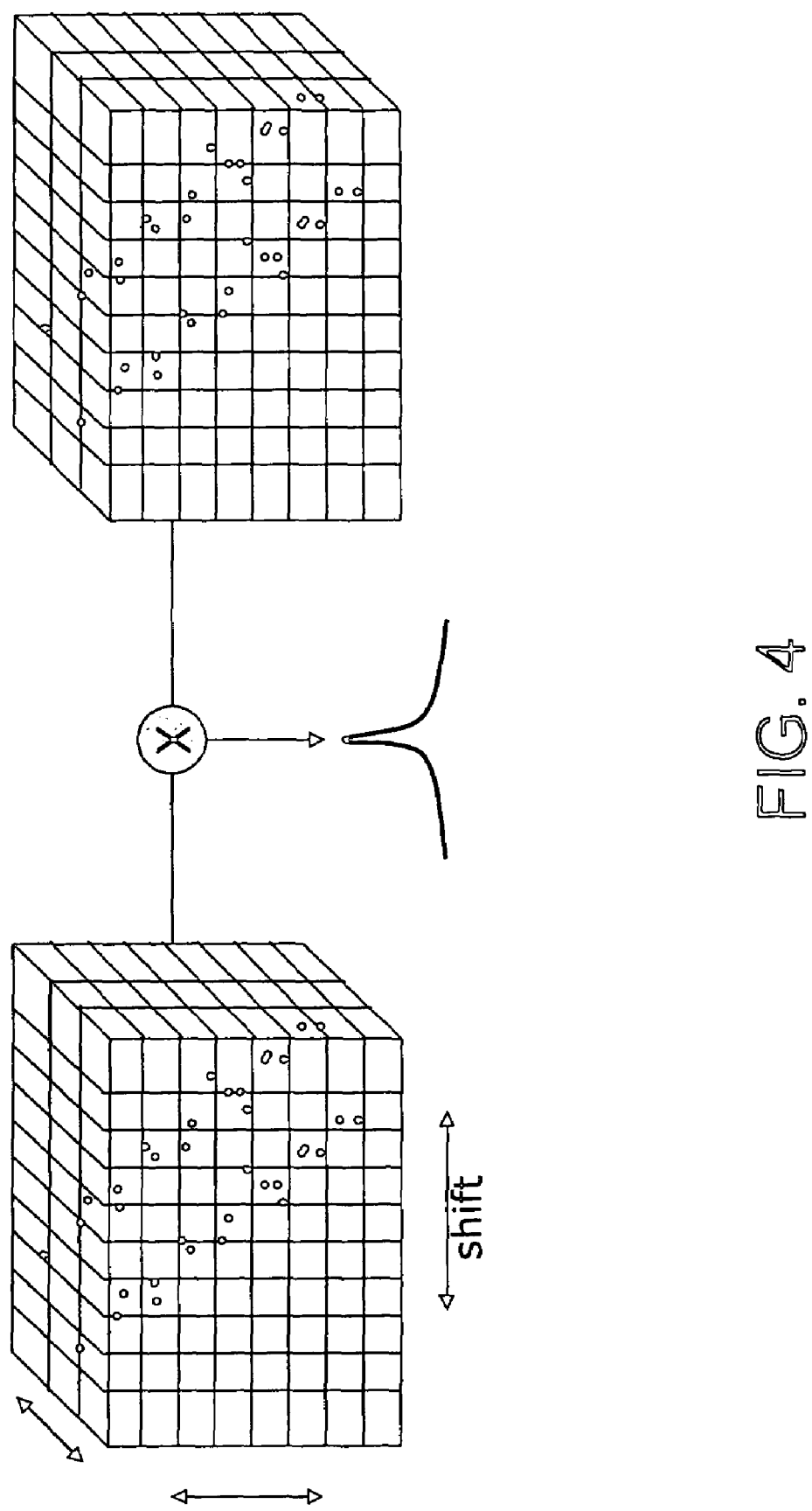
FIG. 4 illustrates a 3D correlation method in accordance with an embodiment of the present invention.

The second approach, which is based on 3D volumetric correlation, does not assume organized point sets. Each frame's points are binned into a coarse 3D grid of binary voxels covering its support, setting a voxel to 1 if the count of points in that cube exceeds a threshold. The two grids are correlated, and the location of the maximum becomes the first shift estimate. This approach is illustrated in FIG. 4. To achieve higher precision, this process is then repeated with successively finer sized voxels, centering a ±1 voxel search range around the previous shift estimate. This coarse-to-fine approach avoids local maxima that could arise if correlation were done only at fine scale over a wide search range. An issue with this scheme is the finite support of each ladar frame. As one frame is shifted, voxels around the periphery of the support no longer overlap the support of the other frame, artificially decreasing the correlation score. To avoid this problem, voxels in the first frame's support that are not completely surrounded by other within-support voxels are always ignored, no matter what shift is being tested.

Figure 5:
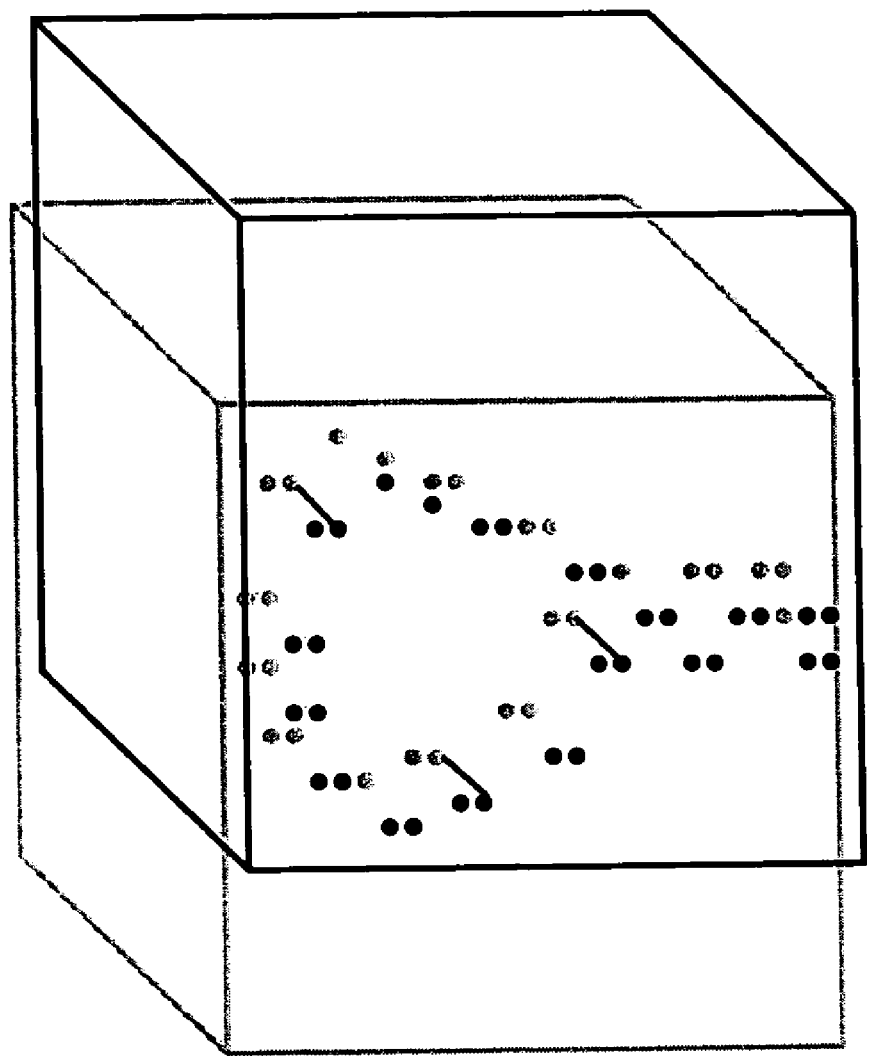
FIG. 5 illustrates an iterated closest points (ICP) method in accordance with an embodiment of the present invention.
Figure 6:
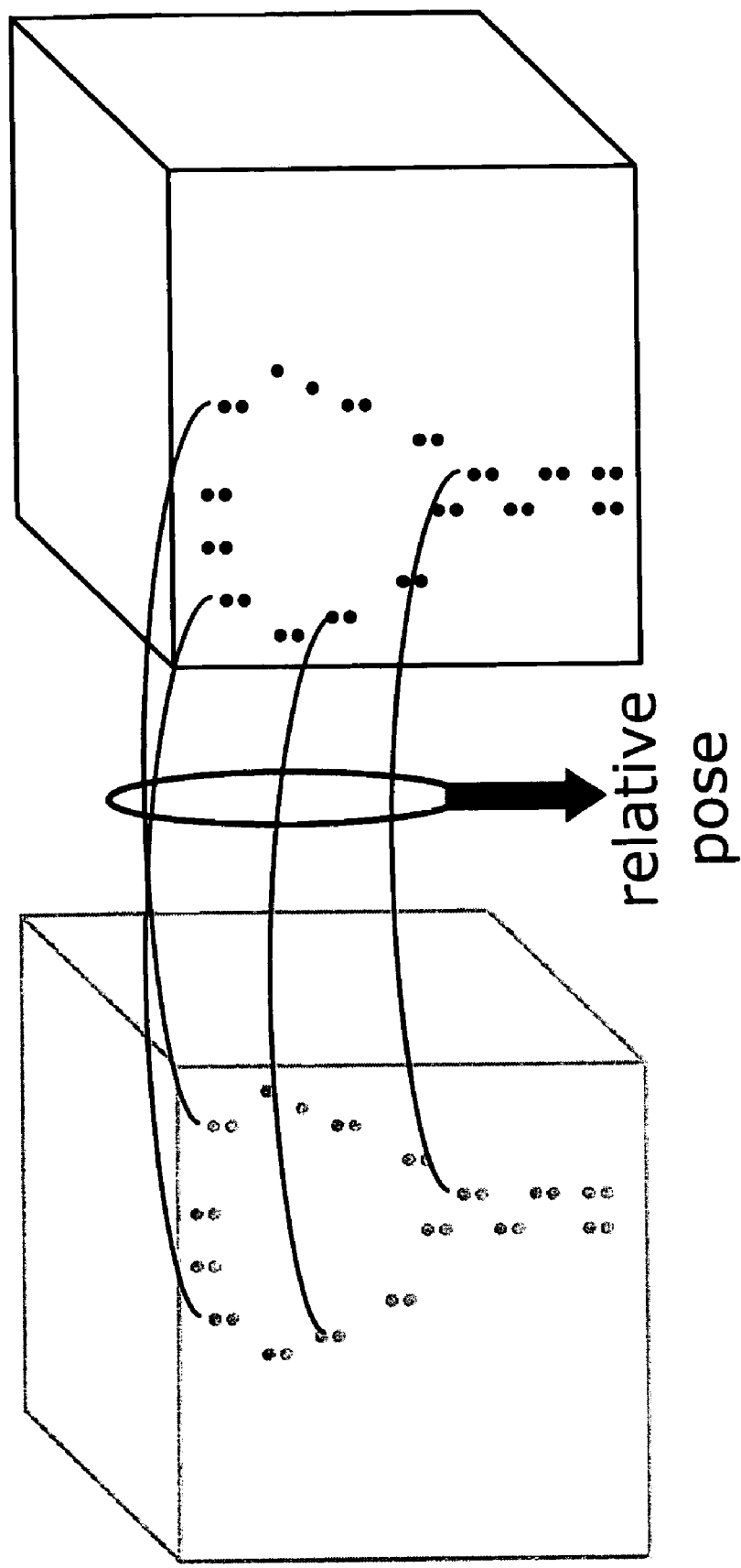
FIG. 6 illustrates an ICP method in accordance with an embodiment of the present invention.

In step 220 a fine registration stage is performed. The method for fine registration of two point sets P and Q belongs to the class of iterated closest points (ICP) algorithms. Computing the relative pose between two sets of N points is straightforward when the points are given in one-to-one correspondence. But given two ladar frames, the correspondence is not known a priori. The ICP approach alternates between estimating correspondences given hypothesized motion and estimating motion given hypothesized correspondences, repeating until convergence. Specifically, if (R, T) is given, then for any point $p_K \in P$ the estimated correspondence is the point $p_k \in Q$ closest to $Rp_k+T$. This concept is illustrated in FIG. 5. Conversely, if many pairs $(p_k, q_k)$ are given, then the best estimate of motion is (R, T) that minimizes $E=\Sigma D(Rp_k+T, q_k)$ summed over all those pairs, where D is a distance metric. This concept is illustrated in FIG. 6. In summary, ICP approximates minimizing the distance from each point in the transformed version of set P to its nearest point in set Q. In one embodiment, the capture range of ICP may be increased by applying multi-resolution ICP. The multi-resolution point cloud is created and the ICP algorithm is applied at each resolution level. In addition to increasing capturing range, other benefits of doing multi-resolution ICP are: 1) the noise level has been reduced at lower-resolution point cloud; and 2) the distance threshold used for higher-resolution can be computed from the voxel size used for the lower-resolution.

Another issue concerning typical ICP is speed. Typically the number of closest points that need to be matched in ICP is huge. Since an ICP algorithm needs certain amounts of data points in order to reliably compute motion, the number of iterations becomes one of the key factors for speeding up the process.

A closest point q of frame S with respect to a reference point p of frame R is found by searching for the nearest neighbor (NN) of Rp+T. The consequence of using NN to find the closest point is that the true corresponding point of Rp+T should be further than or equal to q. Therefore, the motion computed using point pairs (p, q) is an under-estimator. Hence the number of iterations needed could be high. Realizing that point q is an under-estimator of the true corresponding point, we can add some bias by creating a virtual point that extrapolates based on select point pairs Rp+T and q. The present invention then uses the extrapolated point to compute motion. One of the favorable properties of this approach is that the added bias is automatically adjusted based on how far the estimated motion is away from the ground-truth (in noise-clean case). If the motion is already perfect, then the bias term is automatically zero. If the present invention extrapolates the point by 50%, the convergence rate speeds up roughly by a factor of about 1.5. An important implication of adding this automatically adjusted bias is the increase of the capture range for ICP.

The main difficulty that causes convergence of ICP to an inaccurate alignment or even divergence of the algorithm is the presence of many false matches. A false match is a pair of closest points $(p_k, q_k)$ which don't correspond to nearly the same point on scene surface S. Some false matches are to be expected during the course of ICP, but normally the percentage of false matches decreases as (R, T) approaches the correct motion and thus closest point pairs become more likely to be from the same point on S. But excessive false matches are problematic. False matches arise for several reasons, as depicted in FIG. 7.

Figure 7:
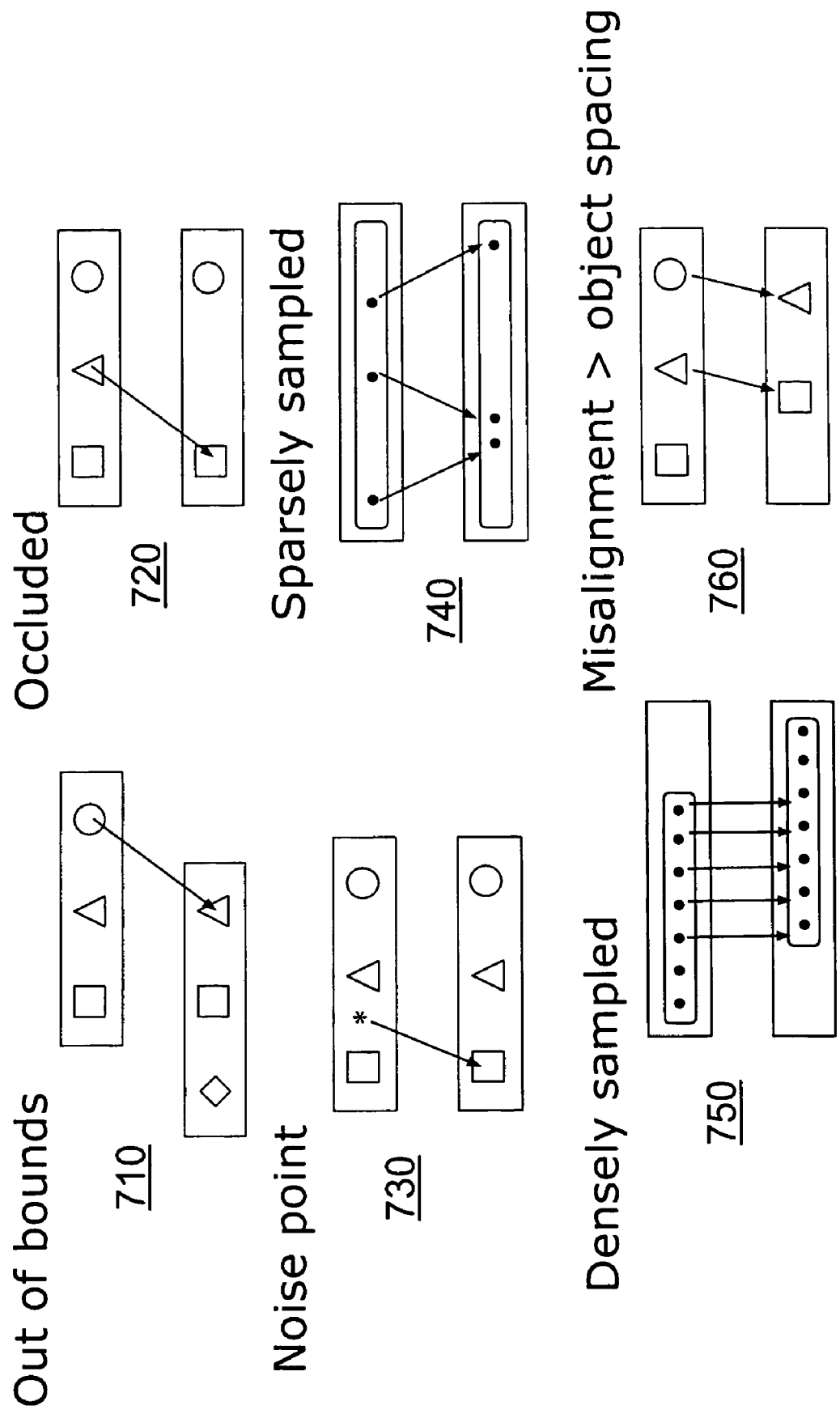
FIG. 7 illustrates situations causing false matches in ICP.

In 710 of FIG. 7 a surface seen in one frame is outside the support of the other frame. This is a very common problem with deleterious effect, but is fortunately easy to avoid.

In 720 of FIG. 7 a surface seen in one frame is occluded in the other frame.

In 730 of FIG. 7, there is an isolated noise point.

In 740 of FIG. 7 a surface is so sparsely sampled that a point in one frame is far from any point of the same surface in the other frame.

In 750 of FIG. 7, conversely, an unoccluded surface is so densely sampled that a point in one frame has a close false match in the other frame no matter how the frames are shifted parallel to the surface. This rarely happens when viewing scenes heavily occluded by foliage, but it is common when viewing surfaces in the clear.

In 760 of FIG. 7, the scene has disjoint structures spaced closer than the current misalignment, so the closest match is found on the entirely wrong structure.

The situations illustrated in 710-740 FIG. 7 could arise even when two frames are well aligned, preventing ICP from converging to the correct motion, while situations illustrated in 750-760 of FIG. 7 arise only while frames are not yet aligned.

The fine alignment process mitigates these false match effects by a combination of tactics. First, if a point $p_k \in P$ transformed to Rpk+T falls outside the support of Q, then the point is ignored since the closest match found within the support would probably be a false match. This bounds test eliminates the situation in 710 FIG. 7. Second, points in either frame on the interior of a smooth densely sampled surface are removed from consideration, avoiding the situation in 730 of FIG. 7. Third, closest point pairs with distance exceeding a limit are ignored, the limit is $d=d_0\alpha^i$, where $d_0$ is the maximum expected uncertainty in alignment of the frame prior to registration, i is the iteration number, and $\alpha$ is a decay constant. Initially, correct matches could be up to $d_0$ apart, so the threshold starts high, but as iterations progress the misalignment is expected to decrease and so the threshold decays to better reject false matches. Fourth, a robust method for estimating (R, T) from point pairs is used as discussed below.

Interior sample removal is accomplished by trying to extract local surface patches from the point set in each frame. At regularly spaced lattice points in the 3D volume, a local plane fit is estimated from the statistics of ladar samples in a window surrounding the analysis location. Letting m be the centroid of samples, the method according to one embodiment eigen-decomposes the covariance matrix $\Lambda=\Sigma(p_k-m)(p_k-m)^T/N$ into $\Lambda=\Sigma\sigma_i^2\phi_i\phi_i^T$. If the least standard deviation $\sigma_3$ is small enough, then the plane passing through m with normal $\phi_3$ is a good fit. If that is true and the analysis location is surrounded in all directions along the plane by other ladar samples, then that location is deemed to be interior to a smooth surface, causing nearby points to be ignored by ICP. Unstructured areas of foliage, critical for registration, are untouched by this filter.

A robust method is employed to incrementally estimate (R, T). Although approximate, it serves the purpose of refining the hypothesized pose so that ICP can converge to the optimum pose. Given the previous estimated (R, T) and a set of closest point pairs $(p_kq_k)$ where $q_k \approx Rp_k+T$, the present invention seeks an incremental motion ($\Delta R\Delta T$) that decreases $E=\Sigma D(\Delta R(Rp_k+T+\Delta T), q_k)$, where $D(a,b)=|a-b|$. Since $\Delta R$ is assumed to be close to identity, the present invention decouples each of the 3 rotational degrees of freedom from translation. First, translation is estimated as $\Delta T=\text{median}\{q_k-(Rp_k+T)\}$, independently in each dimension. The robust center of the translation-corrected points $c_k=R_{pk}+T+\Delta T$ is computed as $\mu=\text{median}\{c_k\}$. Second, the incremental rotation around each axis, x for example, is estimated from median $\{\angle_x(c_k-\mu), (q_k-\mu),\}$ where $\angle_x$ a,b denotes the angle between vectors projected onto the yz plane. Minimizing $L_1$ norm in lieu of least squares methods for absolute orientation provides robustness to false matches.

Another consideration is efficient implementation of ICP. Each iteration processes a different small subset of points randomly sampled from P. The whole set Q must still be searched for closest points, however. The search is accelerated by organizing Q into a K-D tree data structure at the outset, making the search cost proportional to log N per query point.

In step 225 sensor pose is determined. Step 225 is utilized when a multi-view strategy is utilized. A multi-view strategy may be used if an entire sequence of frames are to be registered. Any one of the frames in a sequence, e.g. the middle one, can be picked to fix the reference coordinate system to which all the point sets will be transformed. If the multi-view stage is to be performed, the multi-view strategy will schedule a set of pairwise registrations and then determine the sensor poses with respect to that reference. Moreover, if absolute pose of the reference frame is given by GPS/INS, then all frames will become georeferenced.

Directly registering each frame to the reference frame is one scheme to determine those sensor poses, but temporally distant frames might not share enough common structure to be registered. In a sequence of frames collected by a steadily moving ladar sensor, temporally adjacent frames ($\Delta t=1$) typically see more common scene structure than more distant pairs. This is due both to higher overlap of their supports and to less change in portions of the scene that get occluded. Registering each pair of temporally adjacent frames, then sequentially cascading the transformations, is another scheme, but errors in the pairwise motions tend to accumulate over time, leading to significant misalignment of temporally distant yet spatially overlapping frames. The networks of pairwise alignments corresponding to these two methods are depicted in 810 and 820 of FIG. 8.

To mitigate these difficulties, two general strategies are considered for multi-view registration, hierarchical and bundle. Both reduce the shortest number of hops required to go from any frame to any other frame in the network, compared to cascading.

Figure 8:
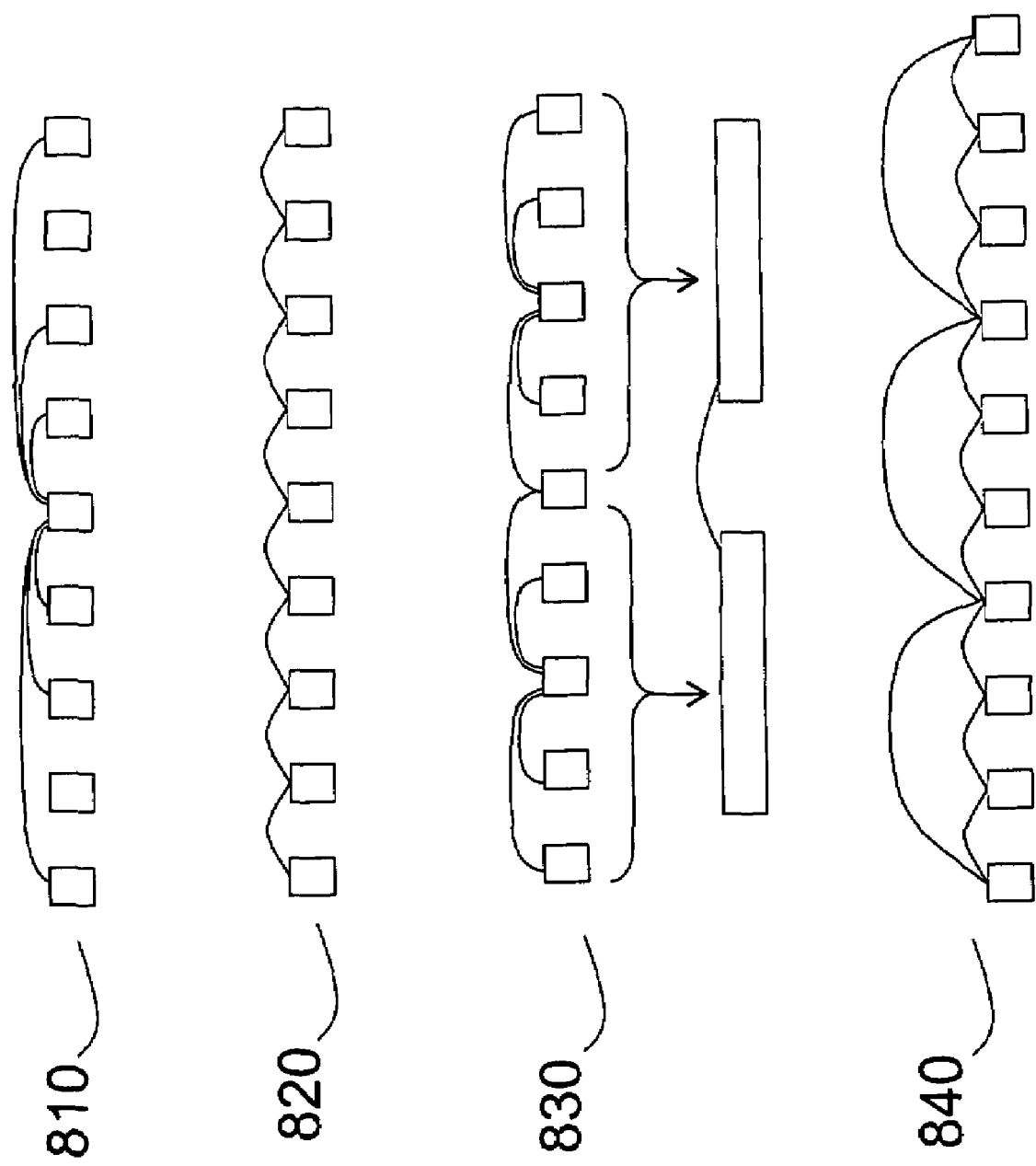
FIG. 8 illustrates a chart representing multi-view strategies.

In the hierarchical approach 830 of FIG. 8, groups of nearby frames are first registered using one of the foregoing schemes, then aggregated into composite point sets. Because the effective support for each composite frame is larger than any single frame, composite frames with large temporal separations could have enough common structure to register. Such a hierarchy can be extended to several layers of registration and aggregation.

In the bundle approach 840 of FIG. 8, pairwise registration is performed on original frames separated by different temporal distances, limited by sufficient overlap. For example, one might register all $\Delta t=1$ and $\Delta t=3$ pairs. Then all the sensor poses are jointly determined so that each pair of them, e.g. ($R_i, T_i$) and ($R_j, T_j$), is consistent with the corresponding pairwise motion ($R_{ij}, T_{ij}$).

Specifically, for each registered pair the error term is defined as $E_{ij} = \Sigma |(R_i p + T_i) - (R_j(R_{ij}p + T_{ij}) + T_j)|^2$, where the sum ranges over some subset of points in support of frame i. Following the virtual correspondence approach, the 8 corners of the bounding box of the support are selected rather than actual ladar point samples; in practice, the results are insensitive to the exact points used. Subsequently, joint optimization seeks to minimize $E = \Sigma E_{ij}$, summed over all pairs of frames, with respect to all poses ($R_i, T_i$) except for the fixed reference. When pairwise motion errors are independent and identically distributed, this would be the optimum least squares estimate. The optimization is readily achieved by the Levenberg-Marquardt method, typically converging in 3 iterations or so.

Coarse search may not be necessary for every pairwise registration scheduled by a multi-view strategy. Previously estimated pairwise motions could be cascaded to provide an initial estimate for registration. For example, if $\Delta t=1$ pairs are registered first in the bundle approach, the $\Delta t=3$ pairs could be initialized by composing the $\Delta t=1$ motions.

In order to illustrate embodiments of the present invention, two datasets are presented: one collected by a non-real-time experimental ladar and one synthesized to simulate a real-time high resolution ladar.

Figure 9:
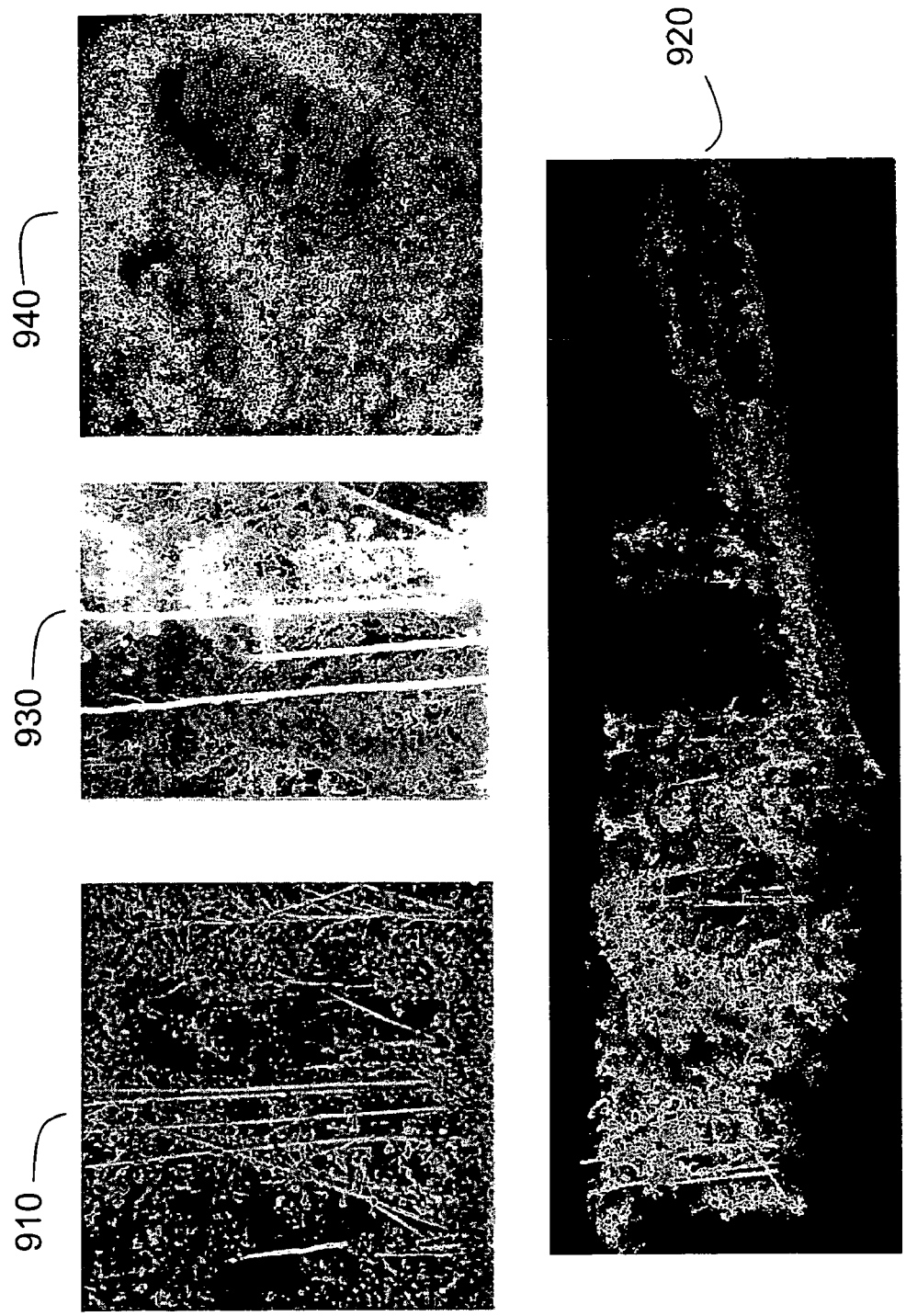
FIG. 9 illustrates digital images of side-looking sequences.

The datasets in FIG. 9 were collected using an experimental ladar developed to show that recording multiple echoes helps to detect targets behind porous occluders. A single laser beam and detector were scanned over a 256×256 raster to collect one frame every 90 s. The entire echo waveform from a laser pulse at each pixel is recorded, from which peaks are detected, yielding multiple range returns per pixel. In this collection, the ladar looks through a line of trees at two vehicles 90 m away, and the ladar is moved to achieve angular diversity of 100 over the 204 frames to be processed.

Picture 910 of FIG. 9 is a photo of the scene that shows that the vehicles are well hidden by foliage to a conventional 2D image sensor. Picture 920 of FIG. 9 is a rendering of the point cloud of a single ladar frame, showing the mass of foliage the ladar must penetrate, while picture 930 of FIG. 9 is the first-return range image representation. A single frame of ladar reveals no recognizable target structure—but fragments of the vehicles should indeed be present. Depending on the frame, ladar samples cover from 1 to 10% of the target surfaces. The frames are then registered using the 2D range image correlation method of coarse search, fine alignment, and a three-level hierarchical multi-view strategy. Aggregating just 30 of the registered frames and cropping away the trees reveals the shapes of a HMMWV and a Chevy Blazer in picture 940 of FIG. 9.

Figure 10:
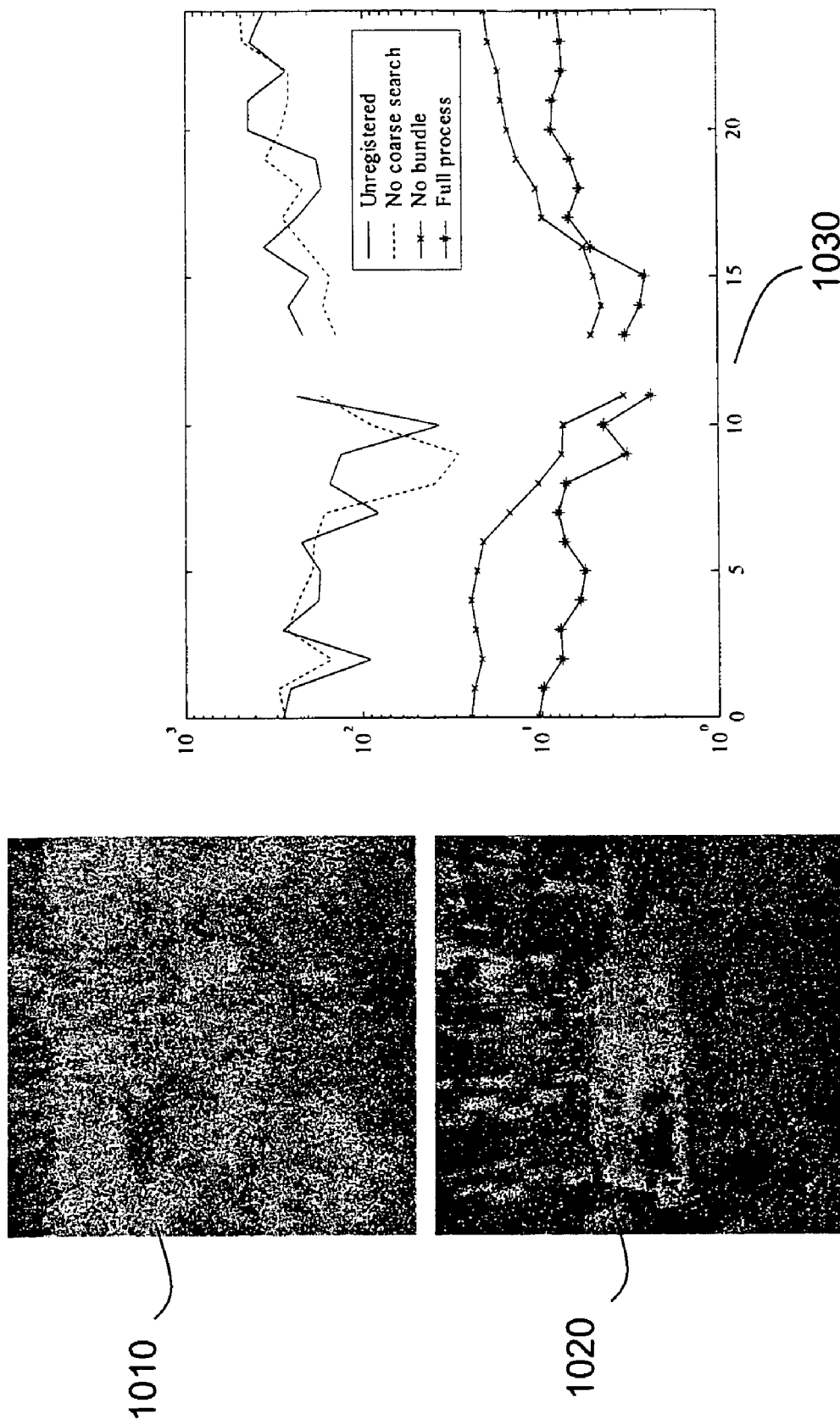
FIG. 10 illustrates digital images of down-looking simulations and illustrates a point sample alignment graph.

The datasets in FIG. 10 were collected using a real-time high-resolution imaging ladar system implemented on an airborne platform using an advanced version of a photon-counting avalanche photodiode-based ladar. In order to quantify the accuracy of the registration approach for that system, synthetic ladar sequences are generated to model the scene structure, laser and receiver physics, and scan pattern of a ladar imaging scenario where this sensor looks down through a forest canopy at a target vehicle. While synthesizing a 25 frame sequence, large GPS/INS pose measurement errors—up to 2.7 m between adjacent frames—and Gaussian range noise—15 cm RMS—are inserted. Depending on the frame, ladar samples cover from 5 to 58% of the target surface.

Aggregating the ladar frames prior to registration and cropping away the tree canopy shows gross misalignment in picture 1010 of FIG. 10. The frames are then registered using the 3D volumetric correlation method of coarse search, fine alignment, and a three-level bundle multi-view strategy. Now the composite point cloud shows a well-defined tank object on a ground plane with tree trunks in picture 1020 of FIG. 10.

The registration error can be evaluated using ground truth sensor poses. Graph 1030 of FIG. 10 plots the RMS error of point sample alignment per frame for the unregistered sequence, for registration omitting coarse search (no better than unregistered), for registration omitting the three-level bundle, and for the full registration process. The RMS errors of the full process are at or below 10 cm, which is less than the dispersion caused by range noise.

Figure 11:
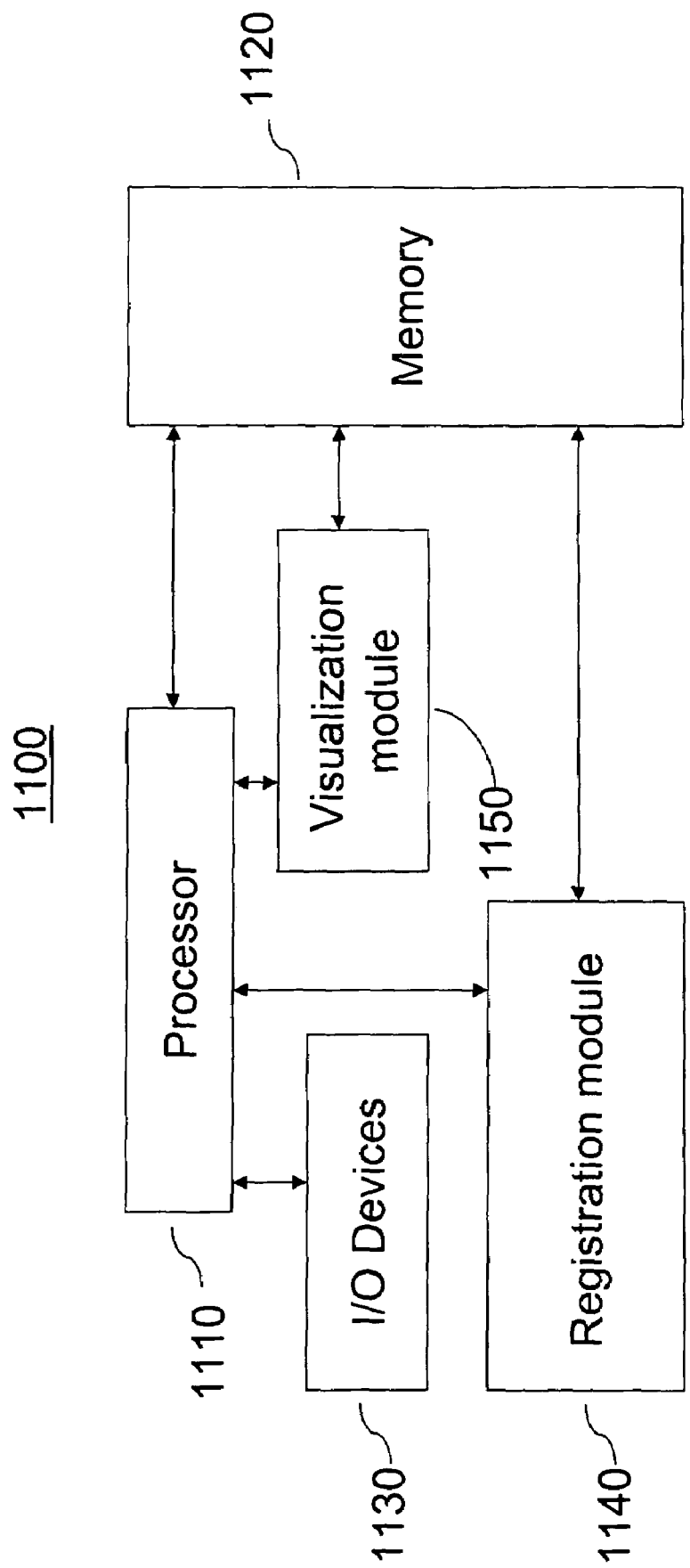
FIG. 11 illustrates an embodiment of a system in accordance with the present invention.

FIG. 11 illustrates a block diagram of an image processing device or system 1100 of the present invention. Specifically, the system can be employed to process an image to locate a target object. In one embodiment, the image processing device or system 1100 is implemented using a general purpose computer or any other hardware equivalents.

Thus, image processing device or system 1100 comprises a processor (CPU) 1110, a memory 1120, e.g., random access memory (RAM) and/or read only memory (ROM), a registration module 1140, a visualization module 1150, and various input/output devices 1130, (e.g., storage devices, including but not limited to, a tape drive, a floppy drive, a hard disk drive or a compact disk drive, a receiver, a transmitter, a speaker, a display, a ladar sensor, an image capturing sensor, e.g., those used in a digital still camera or digital video camera, a clock, an output port, a user input device (such as a keyboard, a keypad, a mouse, and the like, or a microphone for capturing speech commands)).

It should be understood that registration module 1140 and visualization module 1150 can be implemented as one or more physical devices that are coupled to the CPU 1110 through a communication channel. Alternatively, registration module 1140 and visualization module 1150 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 1120 of the computer. As such, registration module 1140 and visualization module 1150 (including associated data structures) of the present invention can be stored on a computer readable medium, e.g., RAM memory, magnetic or optical drive or diskette and the like.

FIG. 11 illustrates a system in accordance with one embodiment of the present invention. The present invention operates on samples of ladar data collected from a scene. Thus, the processor 1110 receives ladar data from sensors 110A-C (e.g., 1130). The ladar data collected from sensors 110A-C is registered using registration module 1140. Once the ladar data is registered, the ladar data may be manipulated to allow a user to identify a target object using visualization module 1150.

Figure 12:
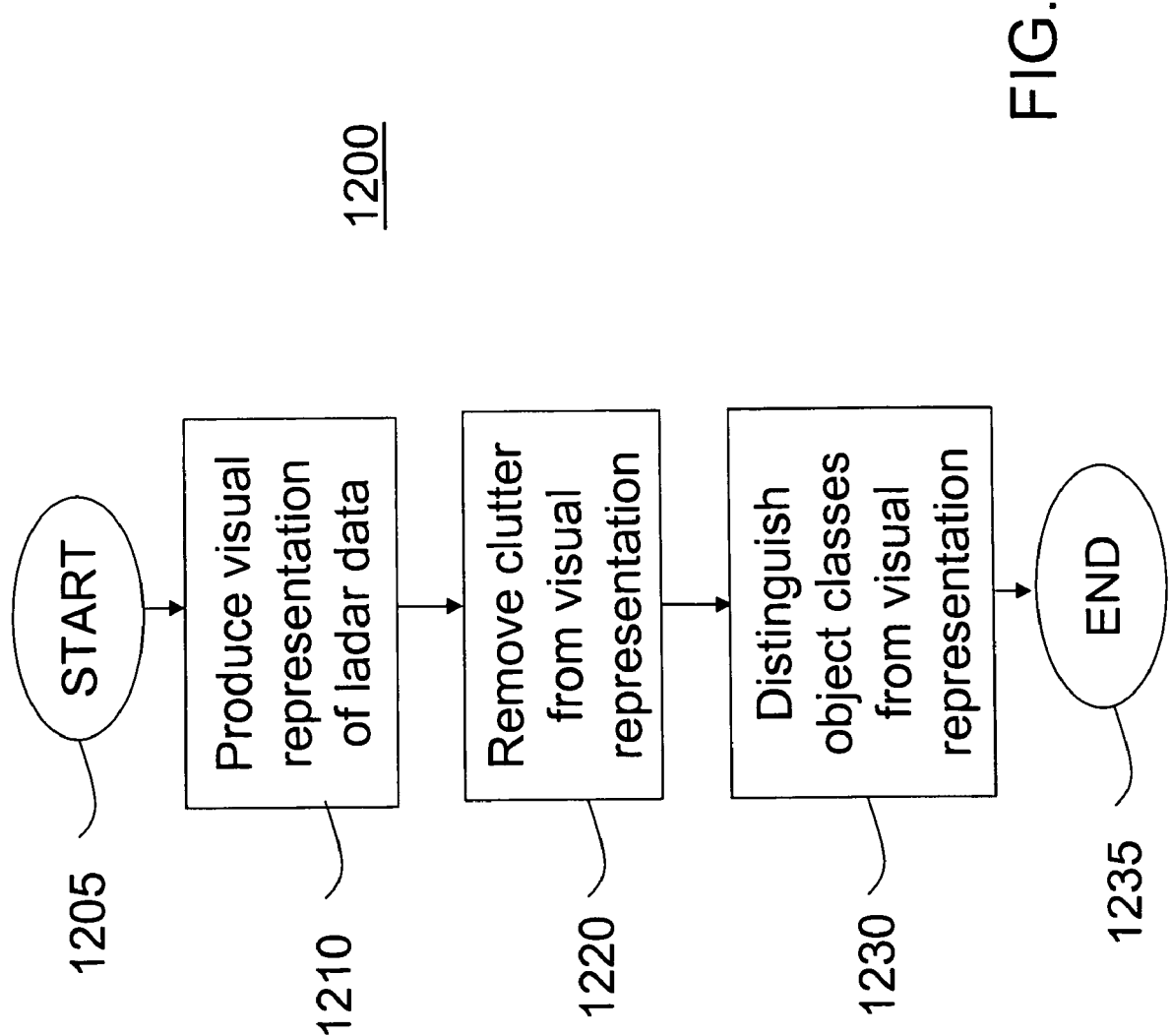
FIG. 12 illustrates a flow diagram in accordance with a method of the present invention.

FIG. 12 illustrates a flowchart in accordance with a method 1200 according to one embodiment of the present invention. Method 1200 receives ladar data and allows the data to be manipulated in order to enhance the recognition of a target object. In one embodiment, once method 200 is completed, method 1200 is performed in order to allow a user to manipulate the data obtained from method 200 so that a target may be recognized. Method 1200 starts in step 1205 and proceeds to step 1210. In step 1210 a visual representation of the ladar data are produced. In step 1220 clutter is removed from the visual representation of the ladar data. In step 1230 object classes may be distinguished from the visual representation of ladar data. Method 1200 ends in step 1235.

In step 1210 a visual representation of ladar data is produced. The composite point cloud aggregated from aligned ladar frames from a diverse set of viewpoints may contain many samples on the objects of interest. However, simply projecting this point cloud as a set of undifferentiated dots onto a 2D computer screen is usually an ineffective presentation. Presenting the data so that an observer can readily comprehend the 3D shape of an object, assess its condition, and positively recognize its identity is essential for practical applications, especially with time-critical operations or untrained users. Challenges in ladar visualization include promoting the perception of 3D shape, cutting through interference and distractions, and knowing where to look in a large dataset.

When the human eye views a natural scene, a large number of cues are utilized to perceive 3D shape, all of them absent from a static display of dots on a 2D screen. Depth cues like binocular Stereo and motion parallax can be perceived using stereo displays, interactive navigation in 3D space, or 2D movies of spinning point clouds. But shape cues such as occlusion, region edges, shading, texture, object segmentation, and perspective. For example, the sample points shown for a front surface are interspersed with points from the back side of the object or background surfaces. Such lack of occlusion leads to visual confusion.

Noise interference and distracting clutter may impede visualization. The desire to operate ladar systems with low laser power or total power budget could result in noisy point clouds, such as random isolated point detections or point position errors. Position error, also induced by misalignment of frames, disperses points from an ideal thin boundary into a thick shell. Clutter objects include porous or solid occluders—foliage, camouflage, fences, buildings—behind which the targets are hiding, as well as any nonoccluding but nonintersecting material in the surrounding area. While the point cloud for an object of interest may indeed be disjoint in 3D space from everything else, it could be hard to choose a 3D viewpoint where clutter isn't occluding or juxtaposed on the 2D screen. Moreover, if the user doesn't know where targets lie in a large dataset, clutter impedes his ability to perform visual search.

To optimize visual exploitation of ladar data, it may be necessary to use an interactive user interface 1130 coupled with basic display manipulations as well as tools based on automatic 3D feature extraction.

The dearth of depth cues in point cloud displays can be enhanced by modulating the point markers. The brightness or color may be a function of height above ground, distance to the sensor, or distance to the viewer. Dot size may be decreased as points recede from the viewer.

Interactive cropping can be very effective in suppressing clutter and interspersed background, as long as one can first visually locate the targets. For example, tree canopy is removed by cropping some height above ground level. Interspersed background can also be suppressed by hidden surface removal, without explicit surface detection: each rendered 3D point p inhibits the rendering of any other point that would be occluded from the current viewpoint by a small sphere centered at p.

Wherever a surface is densely sampled by the composite point cloud, the screen can become crowded with dots or even fill in solidly, preventing perception of the sampled surface. The data set should then be reduced by aggregating fewer frames or by spatial thinning. One way to thin is to bin the points into voxels and display centroids of voxels with above-threshold counts. A related method is to randomly delete points with probability inversely related to the local point density. Thinning also mitigates interference from noise.

Several 3D shape cues depend on seeing continuous 1D and 2D structures, namely edges and surfaces, rather than mere points. Extracting such structures from a set of sample points requires grouping points that belong to the same structure and then interpolating a structure from the samples in each point group. The local surface patch fitting procedure described above for suppressing false matches on smooth densely sampled surfaces is also a basis for enhancing visualization, by rendering surfaces, by segmenting objects, and by removing noise and clutter.

Figure 13:
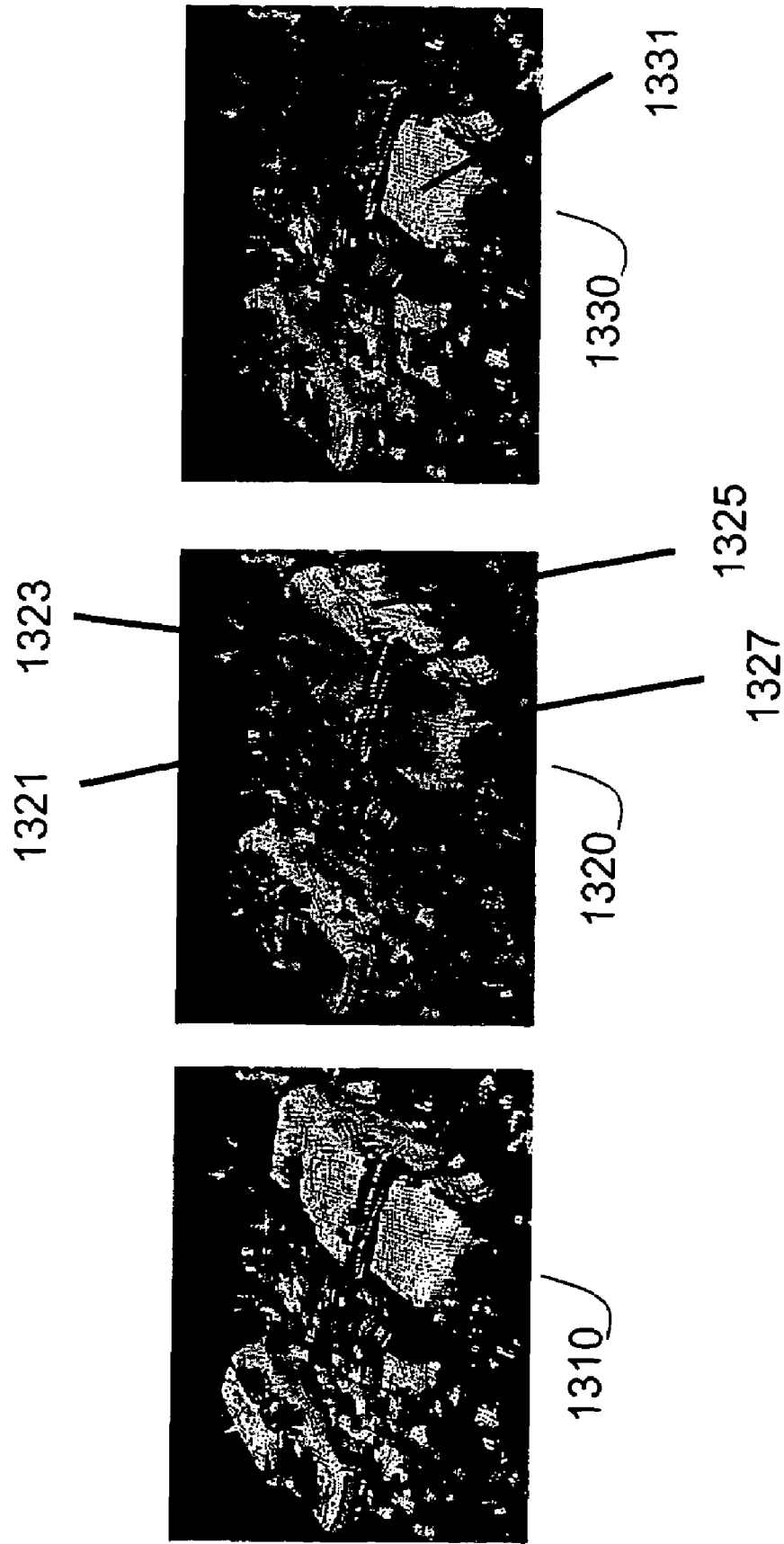
FIG. 13 illustrates digital images of local surface patches.

The first level of surface rendering fits the local surface patches and renders elliptical disks with semi-axes proportional to $\sigma_1$ and $\sigma_2$ shaded with a Lambertian lighting model. Even though the discrete patches are not explicitly merged together into one continuous manifold for each real scene surface, they are readily imagined as smoothly connected. Picture 1310 of FIG. 13 shows the local patch representation of the composite point cloud from the side-looking sequence, illuminated by white light. When lit with colored lights as in picture 1320 of FIG. 13, uniformly colored regions signify identically oriented patches, facilitating visual segmentation into object parts. The top horizontal portions of the vehicles 1321, 1323, i.e., the hood and roof, shown in picture 1320 are colored in blue while the side 1325 and front 1327 portions are colored green and red, respectively.

The second level of surface rendering groups together local patches into connected assemblies. Connected components are formed by linking near-coplanar adjacent local patches. The groups are shown by different color labels in picture 1330 of FIG. 13. Here a patch 1331 is depicted by the color orange.

In step 1220, clutter is removed from the visual representation. Foliage may be characterized as a collection of small surfaces of random orientation, in contrast to vehicular targets, which contain large smooth surfaces. Since adjacent local surface patches in foliage regions are rarely coplanar, connected components in foliage are small. Accordingly, a method for clutter removal is to threshold on the size of connected components. The composite point cloud for the side-looking scene is rendered from the viewpoint of the sensor in picture 1410 of FIG. 14, looking through trees. Without knowing where to look for objects of interest in a large dataset, a user might not bother to navigate through the trees or adjust the cropping window to expose the targets. Picture 1420 of FIG. 14 shows all the connected components, which are rather random, while picture 1430 of FIG. 14 peels away the clutter by keeping components larger than 2 m$^2$.

Another method of clutter removal can be used on downward-looking ladar datasets. No ladar echoes can be returned from 3D positions below an opaque surface. Therefore, when a solid object is entirely surrounded by porous materials like piled-on foliage or camouflage netting, there must be a hollow volume in the 3D point cloud. Samples on the boundary of the hollow can be isolated by "hidden surface" removal with respect to a virtual underground viewpoint.

In step 1230 object classes are distinguished from the visual representation. A ladar looking through porous occluders cannot reliably report target surface reflectivity because the received energy is affected by unknown partial occlusion of the beam. Therefore, ladar data enables reconstructing the 3D geometry but not the space-varying intensity that is usually considered an object's "appearance." 3D size and shape are the only cues available to a human or algorithm for object identification.

Figure 15:
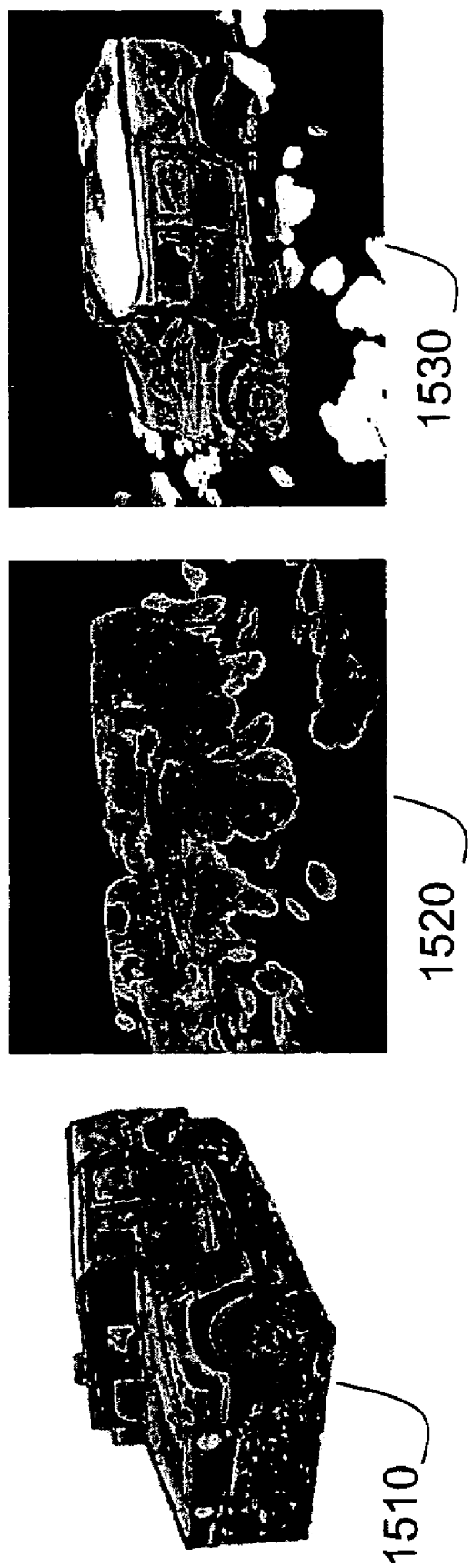
FIG. 15 illustrates digital images showing object identification.

Interactive tools for measuring lengths and areas in 3D may help to distinguish object classes whose parts differ in size. A tool for superposing a CAD model or 2D image of the object can help to confirm an ID hypothesis. Picture 1510 of FIG. 15 shows a reference photo of a HMMWV, a rendering of surface patches interactively aligned with the photo is shown in picture 1520 of FIG. 15, and a rendering of surface patches textured with that photo from another viewpoint is shown in picture 1530 of FIG. 15.

The present invention discloses a method for automatic data-driven registration of 3D imaging ladar data and tools for effective visualization, with adaptations of established algorithmic components needed to support the novel application of reconstructing 3D objects concealed by porous occluders. Details were given for correlation-based coarse search and ICP-based fine registration, which cannot rely on local surface modeling due to scarcity of ladar samples on foliage within each frame. Efficient hierarchical and bundle strategies for consistent registration across multiple frames were described. The difficulty of visualizing 3D point clouds is minimized by the disclosure of useful display techniques and local surface extraction tools, helping users cut through clutter to find objects of interest and facilitating 3D shape perception.

The present invention may be used to process data sets from many different operational ladar sensors, penetrating through trees, camouflage, and window blinds. The results furnish validation of the concept of assembling fragments seen from diverse views into visualizations of coherent 3D objects.

While the foregoing is directed to embodiments of the present invention, other and further embodiments of the invention may be devised without departing from the basic scope thereof, and the scope thereof is determined by the claims that follow.

The invention claimed is:

1. A method of registering ladar data, comprising:
   receiving a plurality of ladar frames; and
   registering at least two of said plurality of ladar frames for determining a sensor pose with respect to a reference, said registering step comprises performing a coarse search for determining a translation shift, wherein said performing said coarse search comprises constructing range images from point sets derived from said at least two ladar frames, estimating a 2D image shift from said at least two ladar frames, scaling said 2D image shift for generating said translation shift in cross-range directions and estimating said translation shift in a down-range direction from said at least two ladar frames.

2. The method of claim 1, wherein said registering step uses information provided by a Global Positioning System (GPS) or Inertial Navigation System (INS).

3. The method of claim 1, wherein said registering step further comprises:
   performing a fine registration.

4. The method of claim 1, wherein performing said coarse search comprises:
   binning point sets from each frame of said at least two ladar frames into coarse 3D grids of binary voxels; and
   correlating the grids for generating said translation shift.

5. The method of claim 3, wherein performing said fine registration employs an iterated closest points (ICP) method.

6. The method of claim 5, wherein said ICP method performs a bounds test for eliminating false matches.

7. The method of claim 5, wherein said ICP method is accelerated by using an extrapolated point to compute motion.

8. The method of claim 5, wherein said ICP method removes points in either ladar frame on an interior of a smooth densely sampled surface from consideration.

9. The method of claim 5, wherein said ICP method ignores closest point pairs within said at least two ladar frames with distance exceeding a limit.

10. The method of claim 5, wherein said ICP method incrementally estimates rotation and translation from point pairs of said at least two ladar frames.

11. The method of claim 10, wherein translation is estimated as $\Delta T = \text{median}\{q_{k-}(Rp_k+T)\}$, a robust center of translation-corrected points $c_k = R_{pk}+T+\Delta T$ is computed as $\mu = \text{median}\{c_k\}$, and rotation around each axis is estimated from median $\{\angle_x(c_k-\mu), (q_k-\mu)\}$ where $\angle_x a,b$ denotes the angle between vectors projected onto the yz plane.

12. The method of claim 5, wherein said ICP method comprises:
  a) creating a point cloud from said at least two ladar frames at a plurality of resolution levels; and
  b) performing said ICP method at each of said plurality of resolution levels.

13. The method of claim 1, wherein said sensor pose is determined using a hierarchical approach, where groups of nearby ladar frames are first registered and then are aggregated into composite point sets.

14. The method of claim 1, wherein said sensor pose is determined using a bundle approach, where pairwise registration is performed on said plurality of ladar frames separated by different temporal distances.

15. The method of claim 14, wherein a visual representation of said at least two ladar frames is produced.

16. The method of claim 1, wherein static noise cleaning is performed before said registering step.

17. The method of claim 1, wherein dynamic noise cleaning is performed before said registering step.

18. An apparatus for registering ladar data, comprising:

means for receiving a plurality of ladar frames; and means for registering at least two of said plurality of ladar frames for determining a sensor pose with respect to a reference, said means for registering comprises means for performing a coarse search for determining a translation shift, wherein said means for performing said coarse search comprises means for constructing range images from point sets derived from said at least two ladar frames, means for estimating a 2D image shift from said at least two ladar frames, means for scaling said 2D image shift for generating said translation shift in cross-range directions, and means for estimating said translation shift in a down-range direction from said at least two ladar frames.

19. The apparatus of claim 18, wherein said means for registering further comprises:

means for performing a fine registration.

20. The apparatus of claim 18, wherein said means for performing said coarse search further comprises:

means for binning point sets from each frame of said at least two ladar frames into coarse 3D grids of binary voxels; and means for correlating the grids for generating said translation shift.

* * * * *